United States Patent
Côté et al.

(10) Patent No.: US 11,521,357 B1
(45) Date of Patent: Dec. 6, 2022

(54) AERIAL CABLE DETECTION AND 3D MODELING FROM IMAGES

(71) Applicant: Bentley Systems, Incorporated, Exton, PA (US)

(72) Inventors: Stéphane Côté, Lac Beauport (CA); William Guimont-Martin, Quebec (CA)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 17/088,275

(22) Filed: Nov. 3, 2020

(51) Int. Cl.
*G06T 7/13* (2017.01)
*G06T 7/73* (2017.01)
*G06V 20/64* (2022.01)
*G06T 19/00* (2011.01)

(52) U.S. Cl.
CPC ............... *G06T 19/006* (2013.01); *G06T 7/13* (2017.01); *G06T 7/75* (2017.01); *G06V 20/64* (2022.01); *G06T 2200/24* (2013.01); *G06T 2207/10032* (2013.01); *G06T 2207/20081* (2013.01)

(58) Field of Classification Search
CPC ........... G06T 19/006; G06T 7/75; G06T 7/13; G06T 2200/24; G06T 2207/10032; G06T 2207/20081; G06K 9/00201
See application file for complete search history.

(56) References Cited

U.S. PATENT DOCUMENTS 9,235,763 B2   1/2016   Joyce et al.
10,564,649 B2  2/2020   van Cruyningen 2004/0119875 A1*  6/2004  Hayaishi .............. H04N 1/00071
                                                      348/362
2014/0177928 A1*  6/2014  Bangay ................. G06V 20/182
                                                      382/113
2018/0218214 A1*  8/2018  Pestun .................... G06T 17/05
(Continued)

OTHER PUBLICATIONS

Nguyen et al., Experiments with UAS Imagery for Automatic Modeling of Power Line 3D Geometry, Electrical Power and Energy Systems 99, 107-120, 2018 (Year: 2018).*

(Continued)

*Primary Examiner* — Diane M Wills
(74) *Attorney, Agent, or Firm* — Cesari and McKenna, LLP; James A. Blanchette (57) ABSTRACT

In one example embodiment, a software application obtains a set of images that include an aerial cable and generates a 3D model from the set of images. The 3D model initially excludes a representation of the aerial cable. The software application processes each image of the set of images to extract pixels that potentially represent cables and determines a position in 3D space of the 3D model of a pair of attachment points for the aerial cable. The software application defines a vertical plane in 3D space of the 3D model based on the pair of cable attachment points. For each of one or more images of the set of images, the software application projects at least some of the pixels that potentially represent cables onto the vertical plane. The software application then calculates a curve representation (e.g., a catenary equation) for the aerial cable based on the pixels projected onto the vertical plane, and adds a cable model defined by the curve representation to the 3D model to represent the aerial cable.

21 Claims, 12 Drawing Sheets

(56) References Cited

U.S. PATENT DOCUMENTS

2020/0074176 A1* 3/2020 Birchbauer ........... B64C 39/024
2021/0142074 A1* 5/2021 Nakano ................. G06V 20/56

OTHER PUBLICATIONS

Nguyen, Van Nhan, Jenssen, Robert, and Davide Roverso. "Automatic autonomous vision-based power line inspection: A review of current status and the potential role of deep learning." International Journal of Electrical Power & Energy Systems 99 (2018): 107-120. (Year: 2018).*

Arastounia, Mostafa, et al., "An Enhanced Algorithm for Concurrent Recognition of Rail Tracks and Power Cables from Terrestrial and Airborne LiDAR Point Clouds," MDPI, Infrastructures, vol. 2, No. 8, Jun. 2, 2017, pp. 1-22.

Jozkow, G., et al., "Experiments with UAS imagery for Automatic Modeling of Power Line 3D Geometry," International Archives of the Photogrammetry, Remote Sensing and Spatial Information Sciences, vol. XL-1/W4, International Conference on Unmanned Aerial Vehicles in Geomatics, Toronto, Canada, Aug. 30-Sep. 2, 2015, pp. 403-409.

Oh, Jaehong, et al., "3D Power Line Extraction from Multiple Aerial Images," MDPI, Sensors, vol. 17, No. 10, Sep. 29, 2017, pp. 1-14.

Sanchez-Rodriguez, et al., "Automated Inspection of Railway Tunnels' Power Line Using LiDAR Point Clouds," MDPI, Remote Sensing, vol. 11, Nov. 1, 2019, pp. 1-13.

U.S. Appl. No. 16/726,412, filed Dec. 24, 2019 by Hoang Hiep Vu et al. for 3D Object Detection From Calibrated 2D Images, pp. 1-28.

U.S. Appl. No. 16/725,465, filed Dec. 23, 2019 by Jean-Philippe Pons for Variational Technique for Texturing a Mesh From Multiple Views, pp. 1-22.

Zhang, Yong, et al., "UAV Low Altitude Photogrammetry for Power Line Inspection," MDPI, ISPRS International Journal of Geo-Information, Jan. 12, 2017, vol. 6, No. 14, pp. 1-16.

* cited by examiner

AERIAL CABLE DETECTION AND 3D MODELING FROM IMAGES

BACKGROUND

Technical Field

The present disclosure relates generally to techniques for three-dimensional (3D) modeling, and more specifically to techniques for detecting and 3D modeling aerial cables from images.

Background Information

Aerial cables (e.g., overhead power lines, telephone lines, guy wires, etc.) are important infrastructure assets that require periodic inspection and maintenance to prevent harm and failures. Each cable segment of an aerial cable (i.e. the span of an aerial cable between two supporting cable attachment points) has important properties, such as sag, that should be monitored. For example, if a cable segment of an overhead power line sags too much, it could collide with trees, vehicles or other environmental elements, creating a risk of an electric shock and a power loss. Detecting this issue as it develops and performing preventative maintenance may prevent these problems. Further, aerial cables are common obstacles that must be avoided during construction, transport and other operations. For example, if a piece of heavy construction equipment should collide with an aerial cable, the wire and the construction equipment may be damaged, and nearby construction workers may be injured.

3D modeling of aerial cables may enable automated sag detection, augmented reality visualization collision avoidance and other applications that can address some of these problems. However, 3D modeling aerial cables on a scale that is useful for such applications presents unique challenges.

Aerial cables are typically modeled using one of a number of techniques, each of which has practical shortcomings. First, aerial cables may be manually defined in a 3D model based on survey measurements (e.g., pole positions, cable attachment points, etc.) captured using a survey station. However, such a technique does not scale well. To model even a small length of aerial cables, significant worker time is required to capture all the required survey measurements, and to enter this data into 3D modeling software. The technique is simply too slow and too expensive to be used at scale, for example, to model all the aerial cables in a city.

Second, aerial cables may be defined in a 3D model based on point clouds captured by Light Detection and Ranging (LIDAR). A laser scanner is positioned at various locations in the environment and used to capture point clouds. The point clouds are then processed by a recognition algorithm to identify and extract 3D models of aerial cables. When point cloud density is sufficiently high, the extracted 3D models may be fairly accurate. However, laser scanners that can produce the needed point cloud density are expensive, and may require specially trained personnel to operate. Accordingly, the technique may be too expensive and difficult to implement to be used at scale, for example, to model all the aerial cables in a city.

Third, aerial cables may be defined in a 3D model using photogrammetry-based techniques that rely on a set of images (e.g., photographs) captured from different locations. The overall operation is often divided into two distinct stages: an aero-triangulation stage and a dense 3D reconstruction stage. The resulting 3D model may take the form of a 3D polygon mesh which represents the reality in the images and therefore may be referred to as a 3D reality mesh.

However, exiting photogrammetry-based techniques have a number of limitations. Some photogrammetry applications require extremely high resolution images to be used with aerial cables. For example, to discern an object a photogrammetry application may need the object to be at least a certain number of pixels wide (e.g., 10 pixels wide). However, aerial cables are typically very thin. To achieve such a pixel width the image resolution may need to be exceedingly high, requiring the use of special cameras and leading to extremely large image sizes that consume excessive storage space. Other photogrammetry applications use algorithms that are extremely processor intensive, and therefore impractical for use at scale on readily-available computing hardware. For example, a photogrammetry application may divide space in each cable segment into voxels, and test each one for the possibility of incorporating a cable. This may necessitate millions or even billions of reprojection calculations on each image for each cable segment. Still other photogrammetry applications require specially captured images that may be impractical to obtain at scale. For example, a photogrammetry application may require pairs of images that have an epipolar direction that is perpendicular to the direction of the aerial cable. This means that the camera cannot simply be moved along an aerial cable capturing images, but that one much cause it to constantly cross the aerial cable in order to capture image pairs located on opposite sides.

Accordingly, there is a need for improved techniques for detecting and 3D modeling aerial cables that may address some or all of these shortcomings.

SUMMARY

In various example embodiments, techniques are provided for detecting and 3D modeling aerial cables from images using photogrammetry techniques which constrain calculations to vertical planes defined by cable attachment points. By constraining calculations, the number of reprojections on each image is minimized permitting operation at scale on conventional computing hardware. Further, the techniques may avoid the need for extremely high resolution images (e.g., such that cables are at least 10 pixels wide) and the storage space issues these may cause, and may avoid the need for specially captured images (e.g., images captured by constantly crossing the aerial cable to obtain image pairs located on opposite sides).

In one example embodiment, a technique is provided for detecting and three-dimensionally (3D) modeling an aerial cable from images using a specially configured software application. The software application obtains a set of images that include the aerial cable and generates a 3D model from the set of images. The 3D model initially excludes a representation of the aerial cable. The software application processes each image of the set of images to extract pixels that potentially represent cables and determines a position in 3D space of the 3D model of a pair of attachment points for the aerial cable. The software application defines a vertical plane in 3D space of the 3D model based on the pair of cable attachment points. For each of one or more images of the set of images, the software application projects at least some of the pixels that potentially represent cables onto the vertical plane. The software application then calculates a curve representation (e.g., a catenary equation) for the aerial cable based on the pixels projected onto the vertical plane, and adds a cable model defined by the curve representation to the 3D model to represent the aerial cable.

It should be understood that a variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description refers to the accompanying drawings of example embodiments, of which.

DETAILED DESCRIPTION

Figure 1:
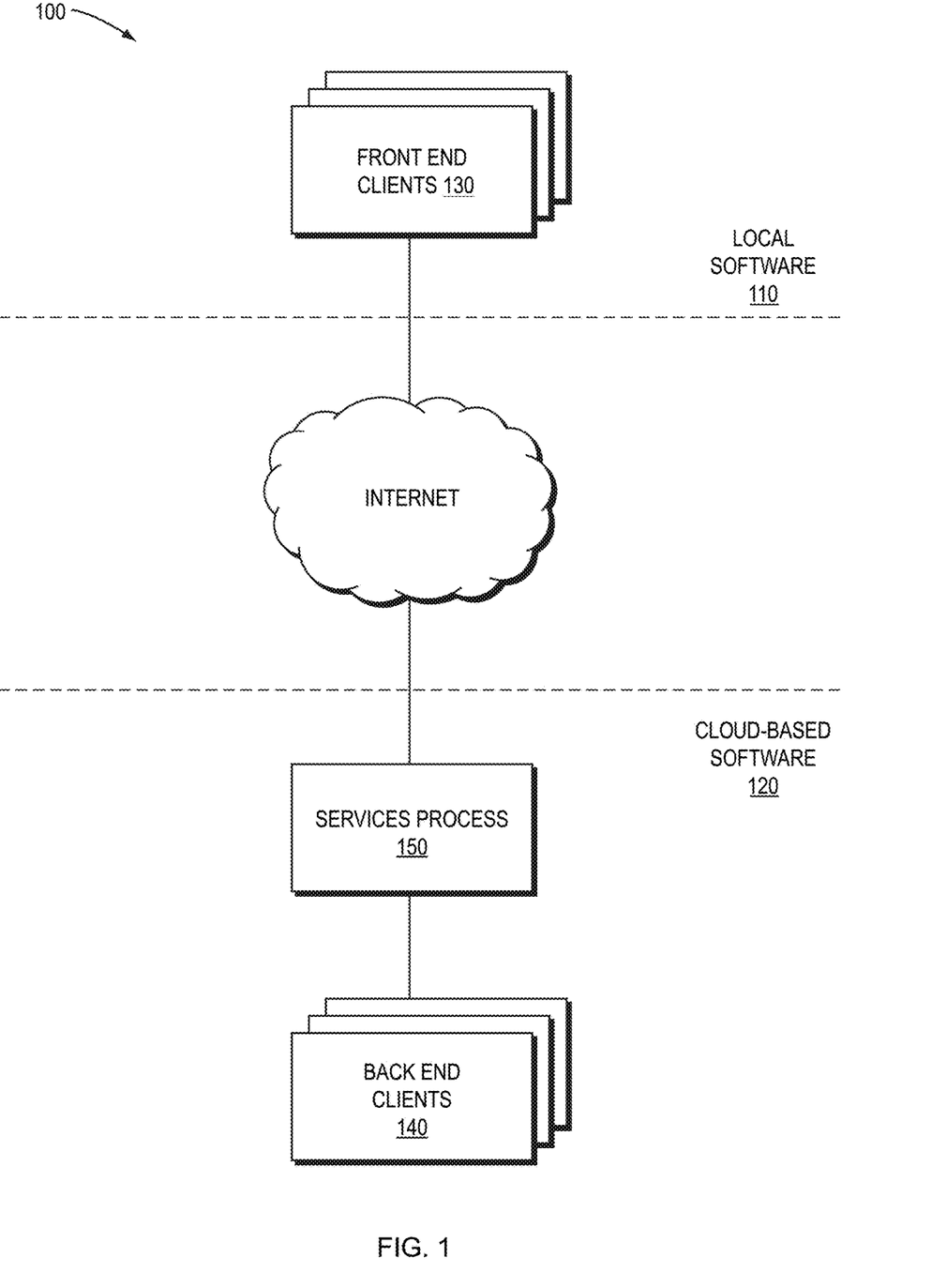
FIG. 1 is a high-level block diagram of an example architecture for a software application that may detect and 3D model aerial cables from images.

FIG. 1 is a high-level block diagram of an example architecture 100 for a software application that may detect and 3D model aerial cables from images. In one embodiment the software application is a photogrammetry application capable of generating a 3D model from images (e.g., photographs) captured from different locations by a handheld or unmanned aerial vehicle (UAV) mounted camera via aero-triangulation and dense 3D reconstruction. One example of such a photogrammetry application is the ContextCapture photogrammetry application available from Bentley Systems, Inc. The 3D model may be a 3D polygon mesh (a 3D reality mesh). It should be understood, however, that the software application may alternatively be another type of software application and that the 3D model may be another type of model.

The architecture 100 may be divided into local software 110 that executes on one or more electronic devices local to an end-user (collectively "local devices") and cloud-based software 120 that executes on one or more electronic devices remote from the end-user (collectively "cloud computing devices") accessible via a network (e.g., the Internet). Each electronic device may include processors, memory/storage, a display screen, and/or other hardware (not shown) for executing software, storing data and/or displaying information. The local software 110 includes frontend clients 130 operating on local devices. The frontend clients 130 provide a variety of functions, including providing a user interface for receiving user input (for example, receiving user selections indicating cable attachment points) and displaying status and results (for example, displaying an initial 3D model without an aerial cable, and afterwards a final 3D model with the aerial cable modeled).

The cloud-based software 120 includes backend clients 140 that provide a variety of functions, including handling processing intensive operations (for example, photogrammetry calculations for generating the 3D model from the images, projecting cable attachment points and pixels, and/or calculating curve representations). To improve performance, the backend clients 140 may be executed on different cloud computing devices or as different threads on the same cloud computing device. The frontend clients 130 and backend clients 140 (collectively "clients") may operate concurrently, with multiple clients 130, 140 performing different operations or portions of the same operation on a 3D model in parallel.

A services process 150 may coordinate operation of the software application and provide access to the image and 3D model data to its clients 130, 140. The services process 150 may include a number of subprocesses (not shown), which perform tasks such as locking and data organization, among others.

Figure 2:
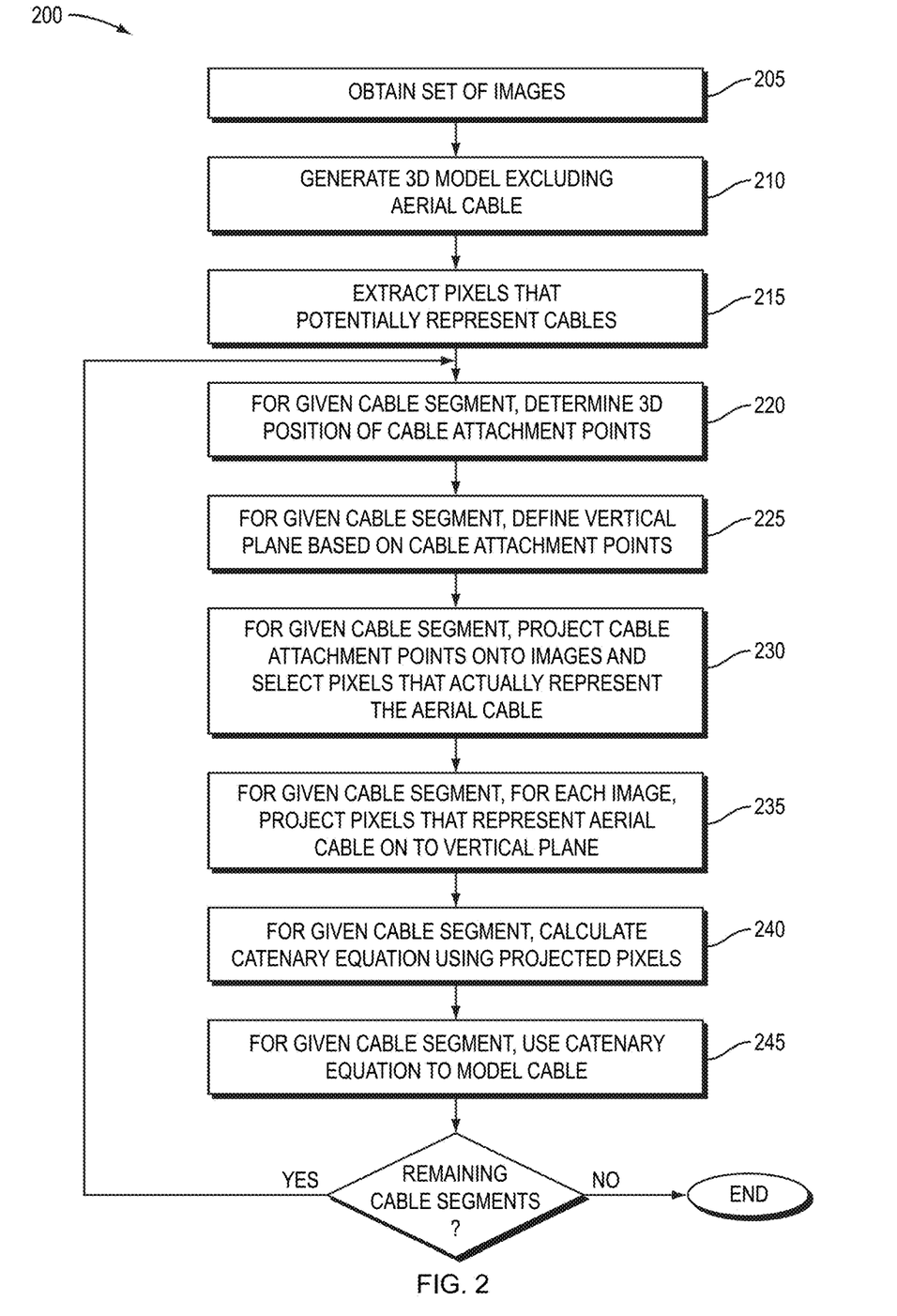
FIG. 2 is a flow diagram of an example sequence of steps that may be executed by the software application from FIG. 1 to detect and 3D model aerial cables from images.

FIG. 2 is a flow diagram of an example sequence of steps that may be executed by the software application from FIG. 1 to detect and 3D model aerial cables from images. At step 205, the software application obtains a set of images that include the aerial cable. The set of images may be a set of photographs that were captured with a handheld or unmanned aerial vehicle (UAV) mounted camera, moving about the physical environment to different points-of-view. In such case, step 205 may include operations to physically capture the set of images and to upload the images from the camera to the software application. It should be noted that the images need not be captured in image pairs located on opposite sides of the aerial cable, and need not be of extremely high resolution (e.g., such that the aerial cable is at least 10 pixels wide).

At step 210, the software application generates a 3D model from the set of images. The 3D model initially excludes a representation of the aerial cable itself. For example, the software application may apply a photogrammetry-based technique that includes an aero-triangulation stage and a dense 3D reconstruction stage. The aero-triangulation stage may involve structure-from-motion (SfM) photogrammetry techniques that compute camera parameters of each of the images (effectively estimating a pose for the images within 3D space of the 3D model) and generating a low-density (i.e. sparse) 3D point cloud based on the camera parameters and information in the images. The 3D reconstruction stage may involve a dense 3D reconstruction that produces a 3D model from the sparse 3D point cloud and camera parameters. The 3D reconstruction stage may apply multi-view stereo (MVS) reconstruction techniques to produce a high resolution dataset and utilize further algorithms to produce the 3D model therefrom. The 3D model may take the form of a 3D polygon mesh (a 3D reality mesh). The aerial cable may be excluded from this initial 3D model as a result of specific operations or simply as a byproduct of its thinness. For example, if an aerial cable has a width in pixels that is less than a threshold required by the photogrammetry techniques to discern objects (e.g., 10 pixels) it may not be discerned and thereby excluded.

Figure 3:
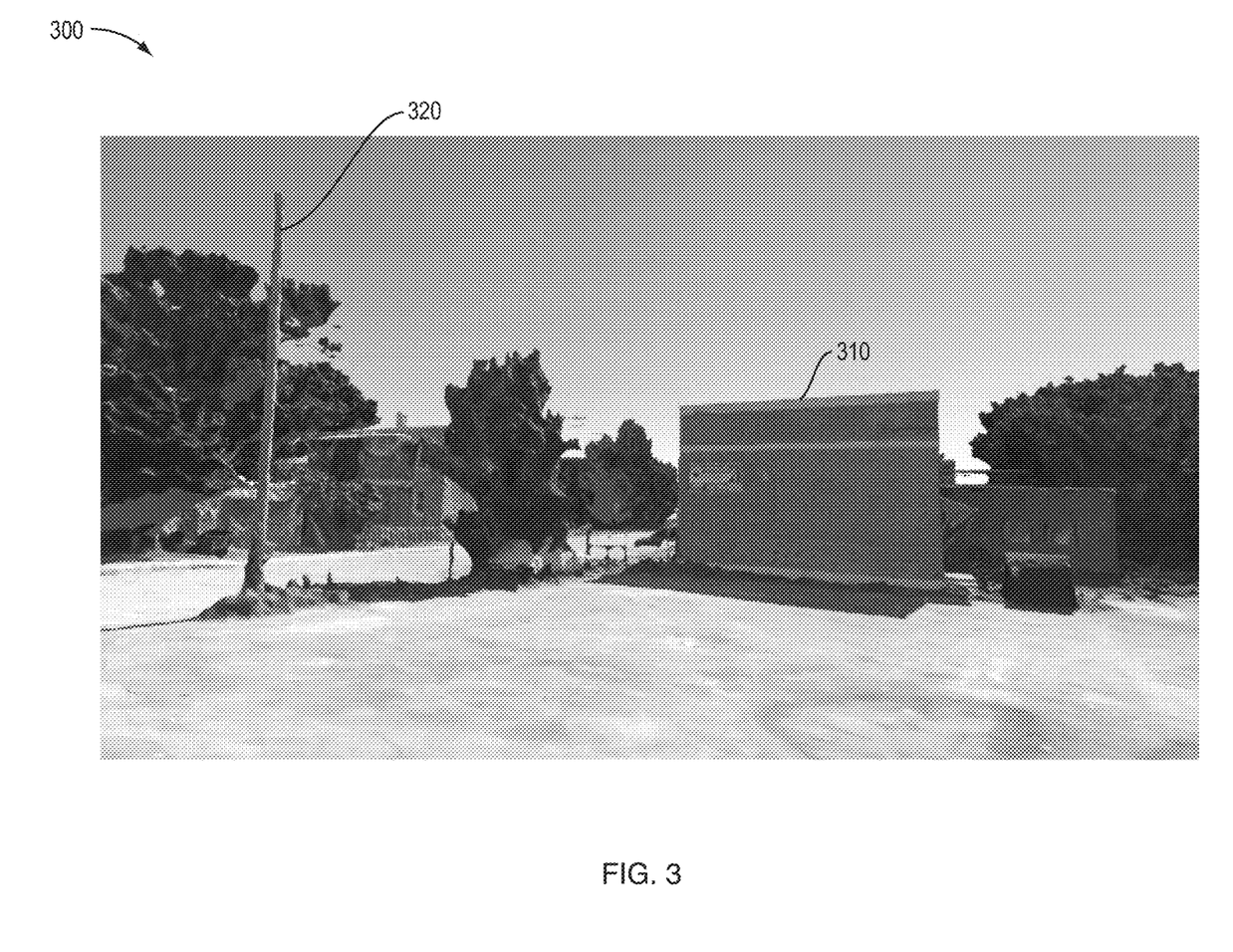
FIG. 3 is a view of an example 3D model that may be generated that initially excludes a representation of an aerial cable.

FIG. 3 is a view 300 of an example 3D model that may be generated that initially excludes a representation of an aerial cable. In reality, a cable segment of an aerial cable extends between the building 310 and the pole 320.

At step 215, the software application takes the same set of images used to generate the 3D model and processes each image of the set to extract pixels that potentially represent cables. The pixels may represent the actual aerial cable, some other cable, or other sharp-edged linear objects or linear portions of objects. In one implementation, as part of step 215, the software application may apply an edge detection algorithm, for example, a Canny edge detector, to each image to produce a corresponding binary image in which some pixels are tagged as potentially representing a cable (i.e. "cable pixels"), and other pixels are tagged as not representing a cable (i.e. "non-cable pixels"). Thresholds used by the edge detection algorithm may be selected to ensure only stronger edges are preserved. The software application may then apply an image transform algorithm, for example, a Hough transform, to each binary image to produce parameters of line segments that each include pixels that potentially represent cables. In other implementations, rather than an edge detection algorithm and an image transform algorithm, other techniques may be used, including various curve detection algorithms, machine learning models, etc.

Figure 4:
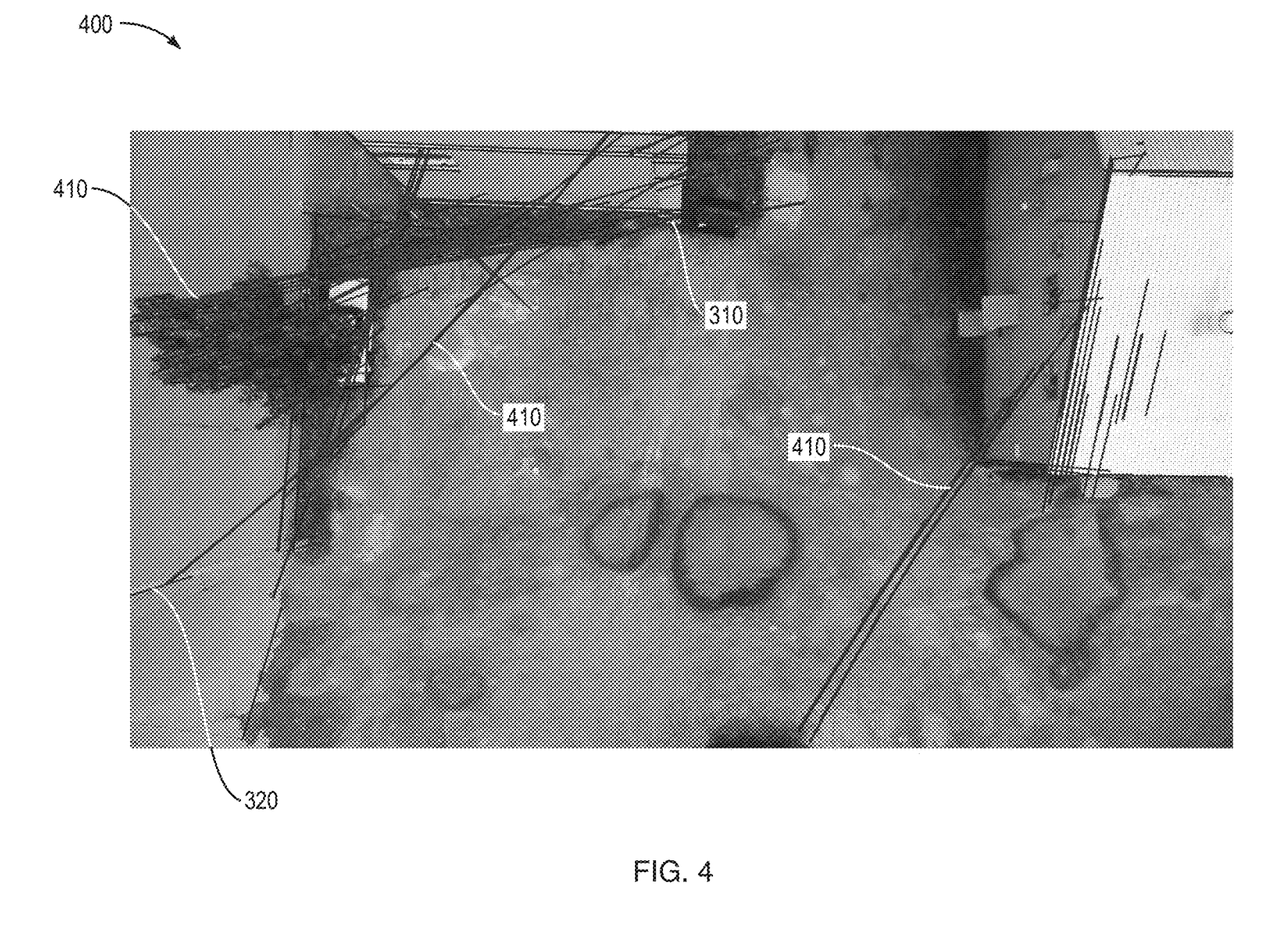
FIG. 4 is an example image with line segments that each include pixels that potentially represent cables.

FIG. 4 is an example image 400 with line segments 410 that each include pixels that potentially represent cables. While the building and the pole from FIG. 3 are reproduced here for illustrative purposes, it should be understood that in an actual implementation the image may be reduced to a binary mask with cable pixels and non-cable pixels.

At step 220, for a given cable segment of the aerial cable, the software application determines a position in the 3D model of a pair of cable attachment points. Such operation may be performed in a variety of different ways. In some implementations, the operation relies upon user selections in a user interface of the software application. In one implementation that relies upon user-selections, the software application shows a user in its user interface an image from the set of images used in the generation in step 210. For the given cable segment of the aerial cable, the user is prompted to select a pair of cable attachment points in the image, for example, by moving a cursor over to a location in the image and selecting (e.g., "clicking"). Once a pair of cable attachment points for a cable segment of the aerial cable is received, the software application projects the pair of cable attachment points in the image into 3D space of the 3D model to determine the position in the 3D model. Such projection may leverage the estimated pose for the image from the aero-triangulation stage used in step 210.

Figure 5:
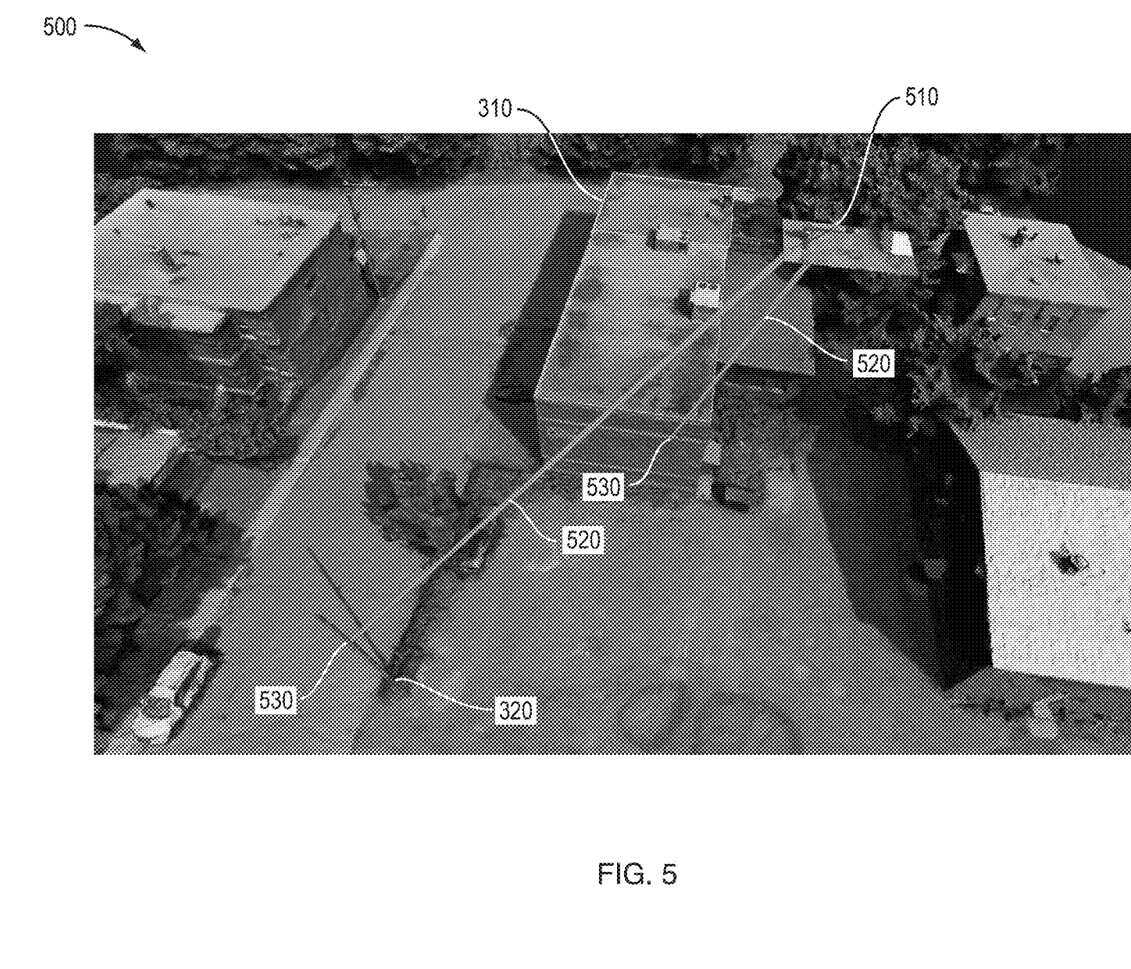
FIG. 5 is a view of an example 3D model showing a pair of cable attachment points selected by a user in an image being projected to positions in a 3D model.

FIG. 5 is a view 500 of an example 3D model showing a pair of cable attachment points selected by a user in an image 510 being projected by projection vectors 520 to positions 530 in a 3D model. In this example, the position of one attachment point is on the building 310 and the other on the pole 320.

When a cable attachment point is projected into 3D space of the 3D model, it should intersect the object that supports the cable in the 3D model. However, due to errors in estimation of the pose of an image, a projection vector may sometimes not exactly interest the correct object. Accordingly, in some implementations, a cone is defined around each projection vector. The intersection of the cone with the 3D model defines a search region. The software application applies a search algorithm within the search region to locate a most likely object or portion of an object in the 3D model that the cable is supported by, and the object position (or portion of the object position) is used as the position of the cable attachment point. Selection may be based on various factors, including object type and other characteristics. In some cases, the software application displays the selected position of each cable attachment point in 3D space of the 3D model in a view of the 3D model in its user interface. The user is prompted to manually fine-tune the position of each cable attachment point in 3D space of the 3D model using the view, for example, by moving (e.g., "dragging") an icon with a cursor.

Figure 6:
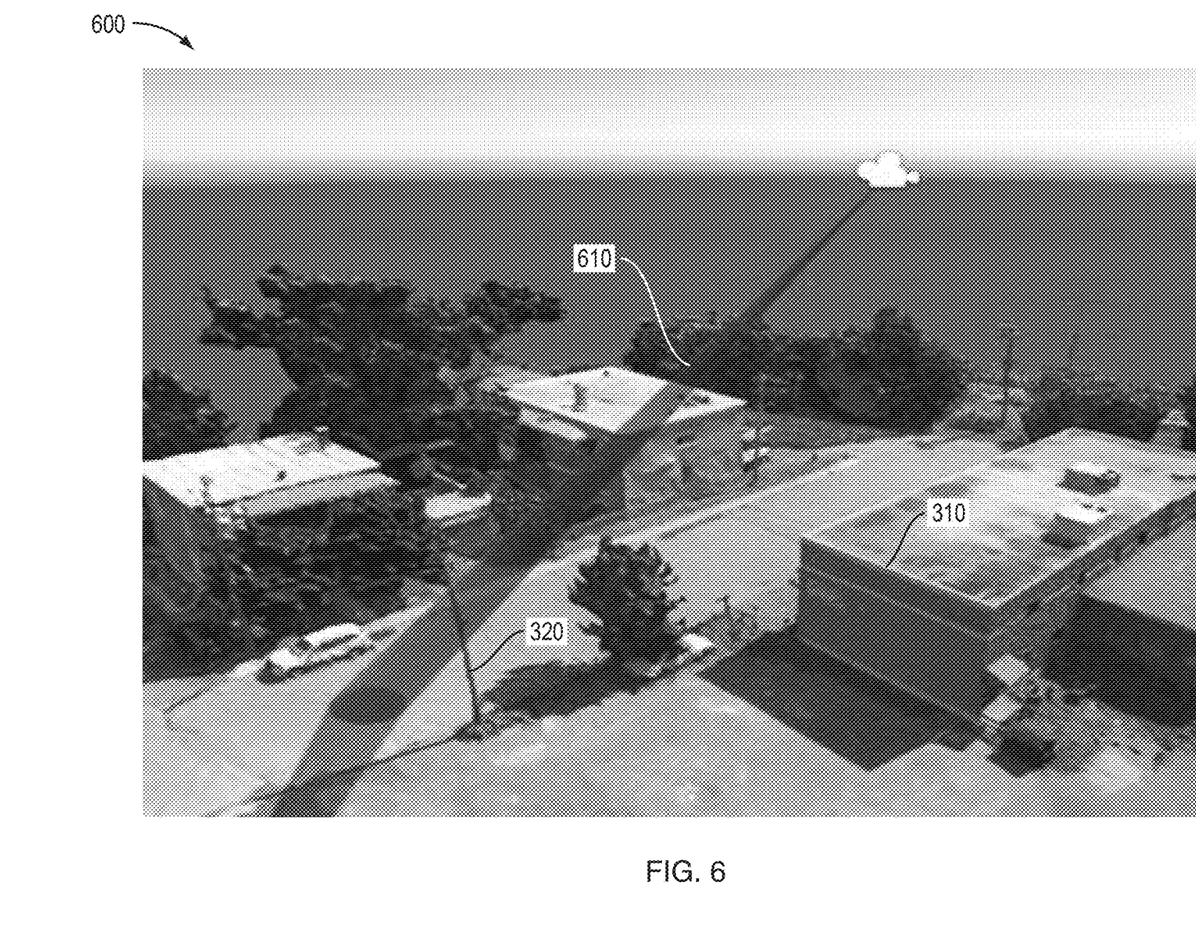
FIG. 6 is a view of an example 3D model showing a cone that defines a search region in the 3D model for an attachment point.

FIG. 6 is a view 600 of an example 3D model showing a cone 610 that defines a search region in the 3D model for an attachment point. In this example, the search region includes part of the pole 320 and part of the ground. A position on that part of the pole is automatically selected as a more likely attachment point for an aerial cable than one on the ground. The position on that part of the pole may then be manually fine-tuned by the user.

In another implementation of step 220 that relies on user-selections, the software application shows the user multiple images from the set of images used in step 210 in it user interface. For the given cable segment of the aerial cable, the user is prompted to select a pair of cable attachment points in a first one of the multiple images, for example, by moving a cursor over to a location in an image and selecting (e.g., "clicking"). The software application calculates corresponding positions in the other ones of the multiple images, for example, using tie point functionality from the aero-triangulation stage in step 210. The software application displays the cable attachment points at the corresponding positions in the other ones of the multiple images, and the user is prompted to manually fine-tune them, for example, by moving (e.g., "dragging") an icon with a cursor. For each attachment point, the software application projects the position from each of the multiple images into 3D space of the 3D model, and the intersection of such projections defines a position in the 3D model. As in the above implementations, such projections may leverage the estimated pose for the images from the aero-triangulation stage in step 210. Likewise, as above, rather than simply use projection vectors, a cone may be used for each image, with the intersection of cones defining a search region from which an attachment point in the 3D space of the 3D model is selected.

In other implementations of step 220, the operation may be fully automated. In one fully automated implementation of step 220, cable attachment points are determined by an algorithm that detects curve discontinuity at positions along the aerial cable in an image of the set of images. In such an algorithm, the software application first organizes at least some of the line segments with cable pixels from the image transform algorithm (e.g., Hough transform) in step 215 into a cable by finding line segments that lead to other line segments. Starting with one line segment of the cable, a segment-to-segment angle is calculated along the cable. When the segment-to-segment angle is less than a pre-determined threshold, the line segments are considered to belong to the same cable segment. When the segment-to-segment angle meets or exceeds the pre-determined threshold, a curve discontinuity is noted and the line segments are considered to belong to different cable segments. Based on the line segments of each cable segment, the software application calculates an equation of each cable segment (e.g., using a least-squares method). The software application then calculates the intersection of the equation for each adjacent cable segment, and each intersection point is considered an attachment point in the image. For each attachment point, the software application projects the position from the image into 3D space of the 3D model. As in the above implementations, such projection may leverage the estimated pose for the image from the aero-triangulation stage used in step 210. Likewise, as above, rather than simply use a projection vector, a cone may be used to define a search region from which an attachment point in the 3D space of the 3D model is selected.

In another fully automated implementation of step 220, cable attachment points are determined by a machine learning model trained on a training dataset of images with labeled cable attachment points. The software application applies the trained machine learning algorithm to an image of the set of images to identify cable attachment points in the image. For each attachment point, the software application projects the position from the image into 3D space of the 3D model. As in the above implementations, such projection may leverage the estimated pose for the image from the aero-triangulation stage used in step 210. Likewise, as above, rather than simply use a projection vector, a cone may be used to define a search region from which an attachment point in the 3D space of the 3D model is selected.

It should be understood that a wide variety of other automated algorithms or techniques may be used to determine position in the 3D model of a pair of cable attachment points.

At step 225, for the given cable segment of the aerial cable, the software application defines a vertical plane in 3D space of the 3D model based on the pair of cable attachment points. The vertical plane is bounded horizontally by the horizontal position of each of its cable attachment points. The vertical plane is bounded vertically by the ground and by a height that is based on the vertical position of one or more of its cable attachment points. For example, the height may coincide with, or exceed by a predetermined amount, the vertical position of the higher of the two cable attachment points.

Figure 7:
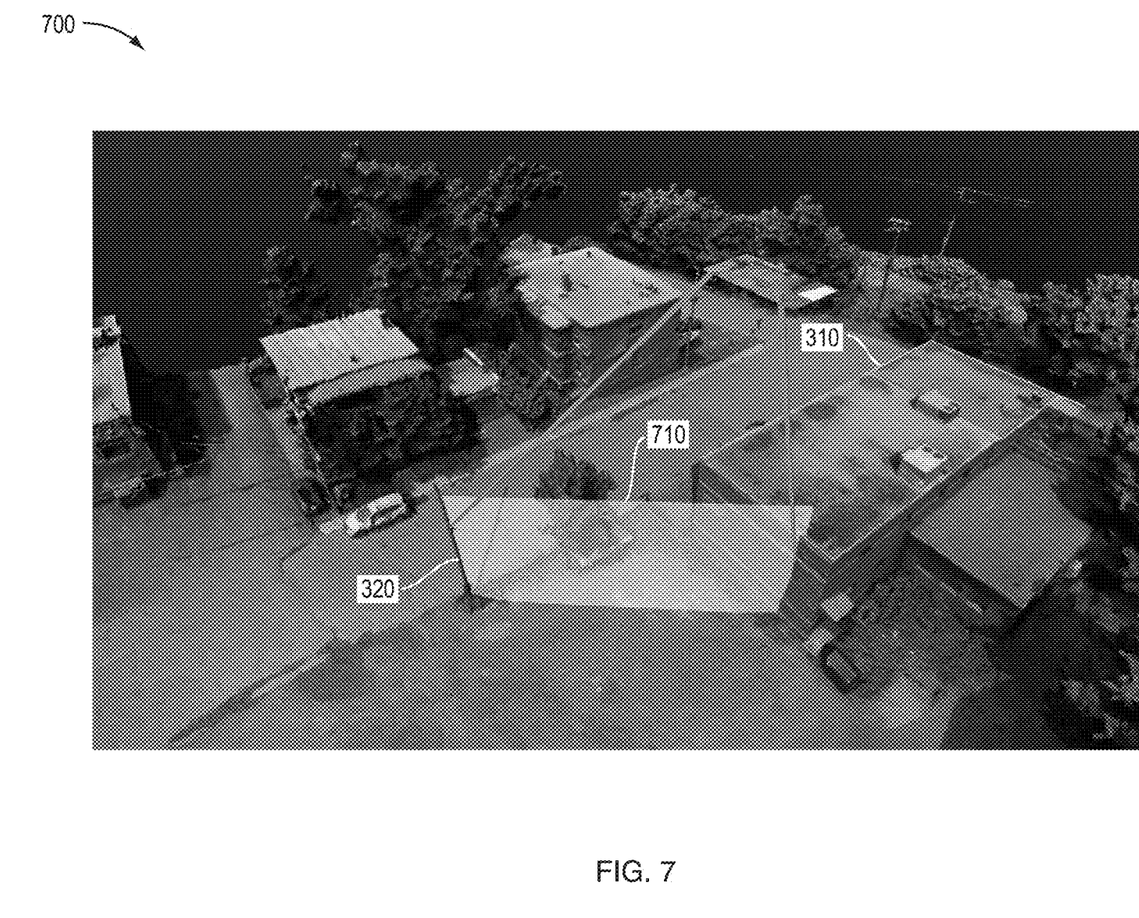
FIG. 7 is a view of an example 3D model showing a vertical plane defined in 3D space based on a pair of cable attachment points.

FIG. 7 is a view 700 of an example 3D model showing a vertical plane 710 defined in 3D space based on a pair of cable attachment points. In this example, the vertical plane 710 extends horizontally between the cable attachment point on the building 310 and the pole 320, and vertically between the ground and a height based on one or more of the cable attachment points.

At step 230, for the given segment of the aerial cable, the software application projects the pair of cable attachment points in 3D space onto images that include them, to select from pixels that potentially represent cables those pixels that actually represent the aerial cable. As discussed above, in step 215, an edge detection algorithm (e.g., a Canny edge detector) and image transform algorithm (e.g., a Hough transform) may return a number of line segments that include pixels that potentially represent cables. Some may represent the actual aerial cable and others may represent other things in the scene. The software application uses the projection of the pair of cable attachment points to eliminate pixels that are inconsistent with cable attachments, to leave just the pixels that represent the actual aerial cable. For example, pixels of line segments that are not between the pair of cable attachment points in an image are eliminated. Likewise, line segments that are above the pair of cable attachment points in an image are eliminated (because aerial cables sag downwards, not upwards).

Figure 8:
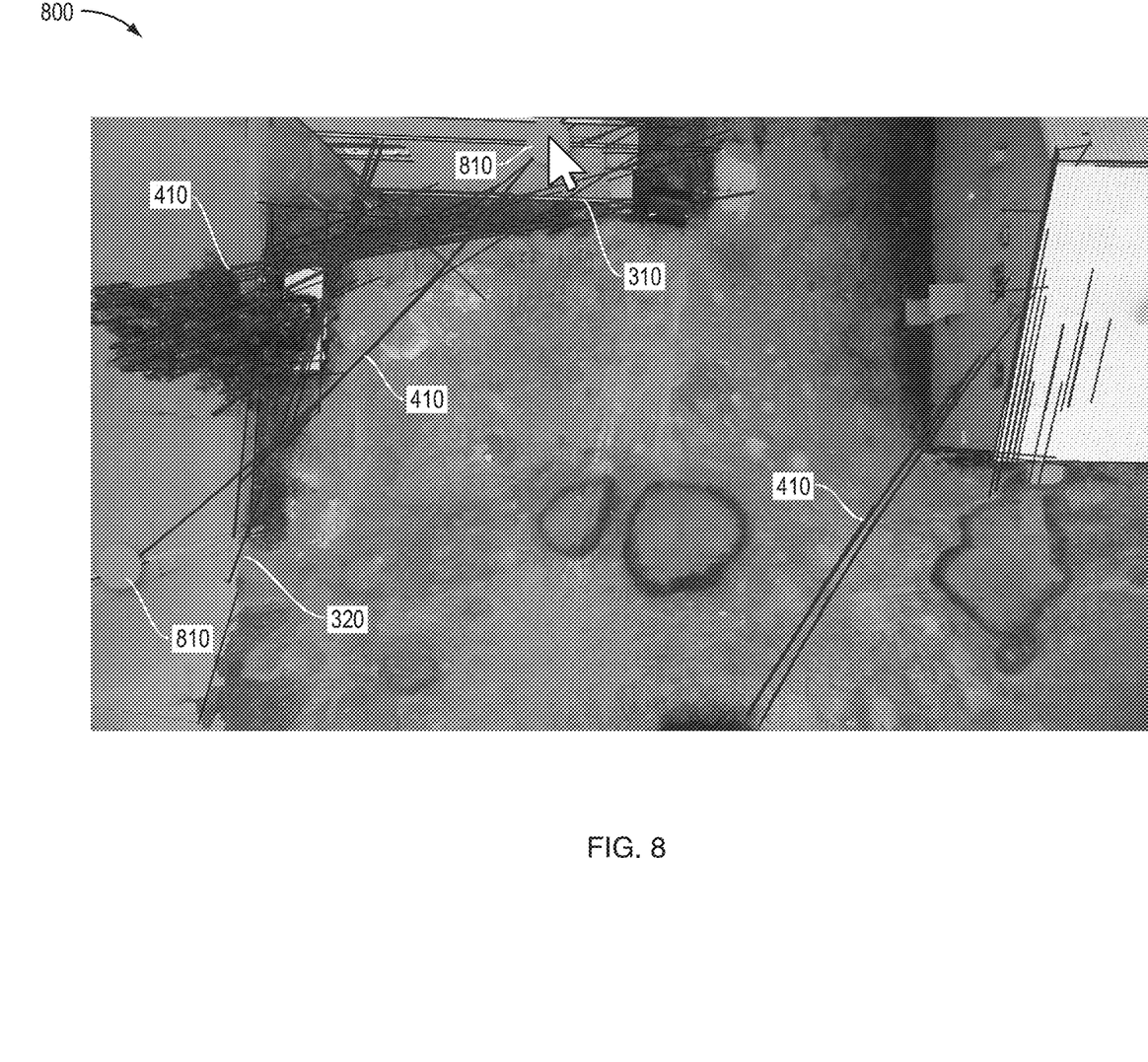
FIG. 8 is an image with line segments that each include pixels that potentially represent cables (similar to FIG. 4) with a projected pair of cable attachment points.
Figure 9:
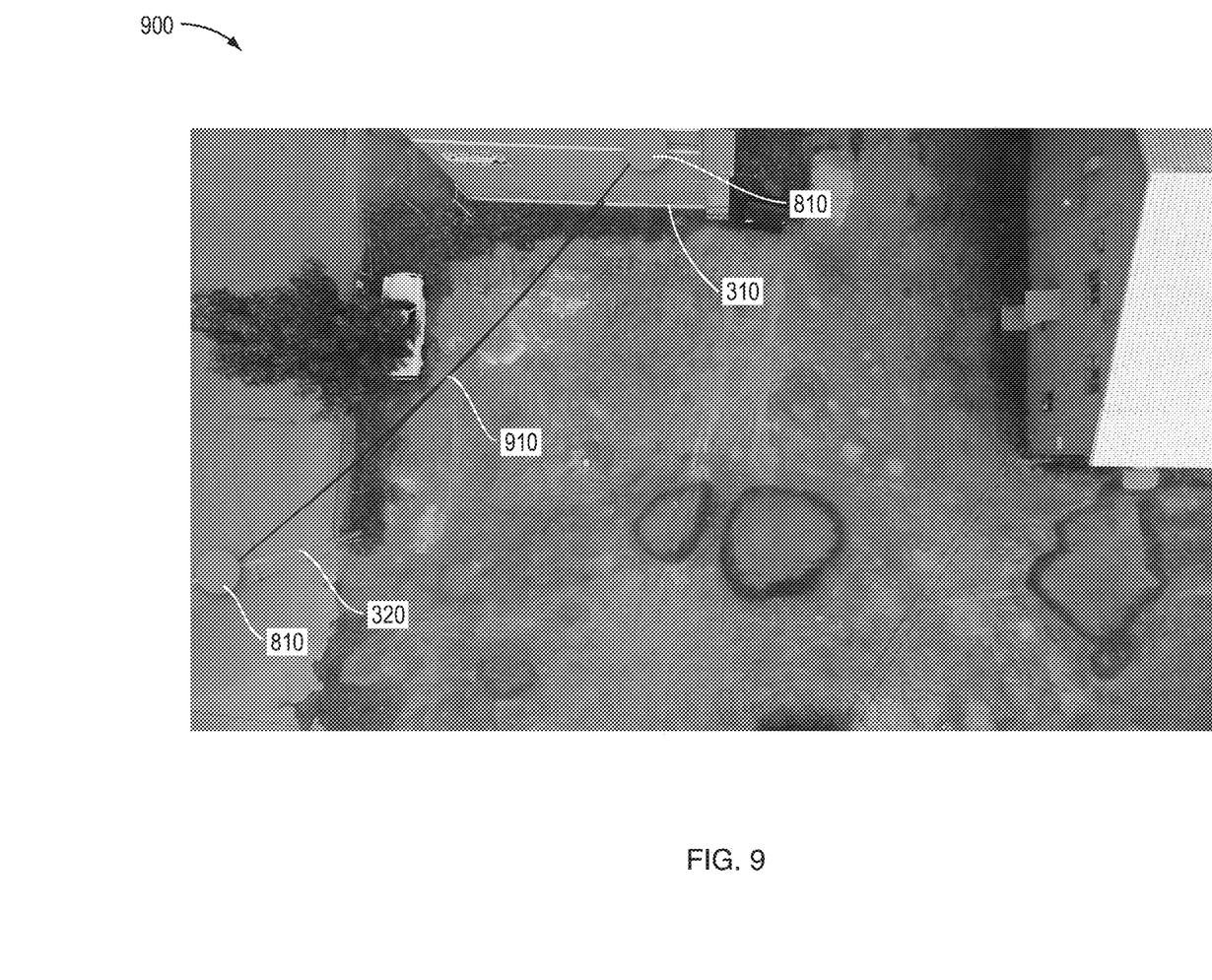
FIG. 9 is an example image with line segments that are inconsistent with a pair of cable attachment points removed, leaving only line segments that represent an actual aerial cable.

FIG. 8 is an image 800 with line segments 410 that each include pixels that potentially represent cables (similar to FIG. 4) with a projected pair of cable attachment points 810. FIG. 9 is an example image 900 with line segments that are inconsistent with a pair of cable attachment points removed, leaving only line segments 910 that represent the actual aerial cable.

At step 235, for the given cable segment of the aerial cable, for each image that includes the aerial cable, the software application projects the pixels that represent the aerial cable from the image onto the vertical plane in the 3D model. As discussed above, the pixels that represent the aerial cable may be organized as line segments, and the projecting projects the line segments that represent the aerial cable onto the vertical plane.

Figure 10:
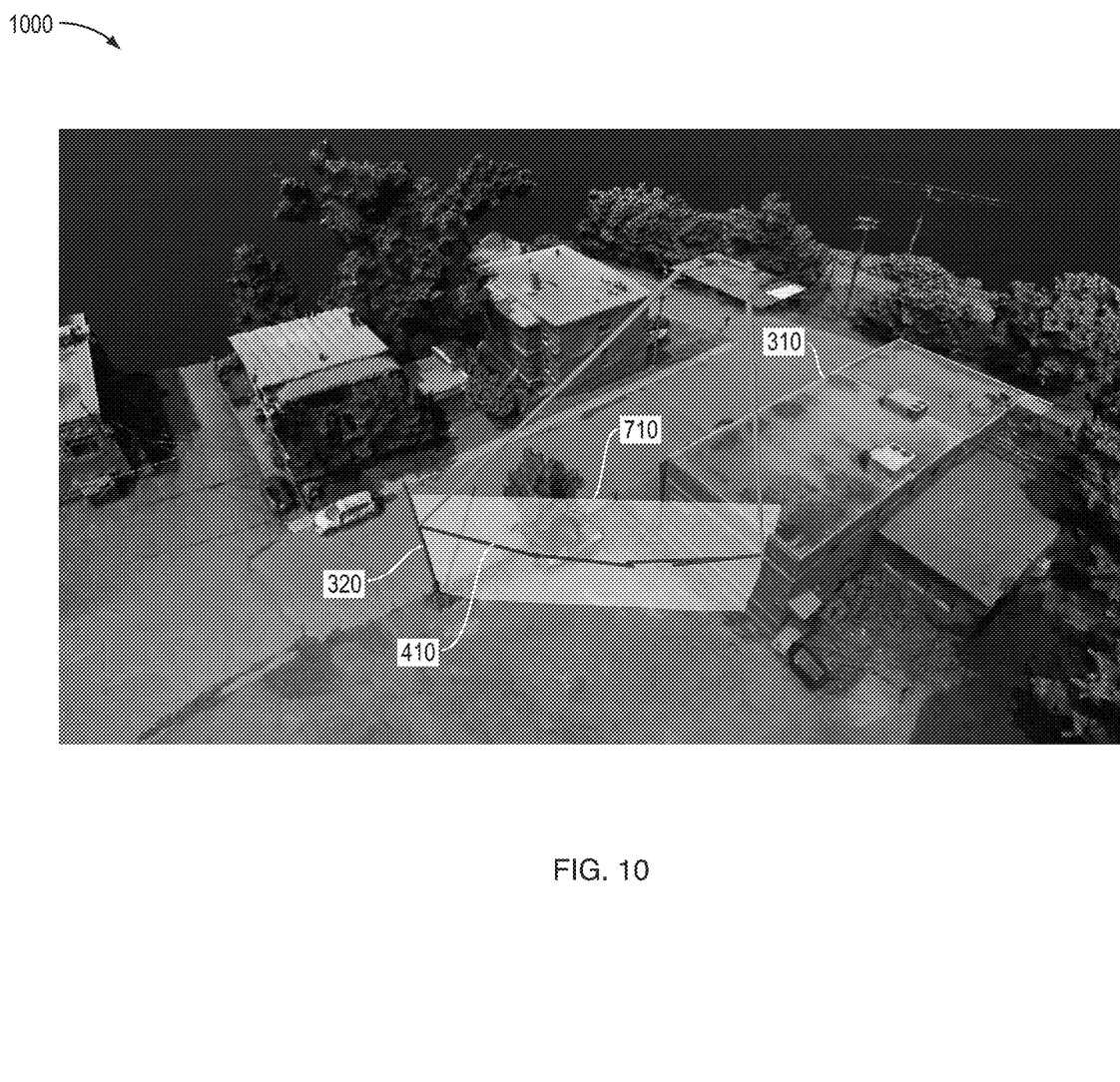
FIG. 10 is a view of an example 3D model showing line segments that include pixels that represent an aerial cable projected onto a vertical plane.
Figure 11:
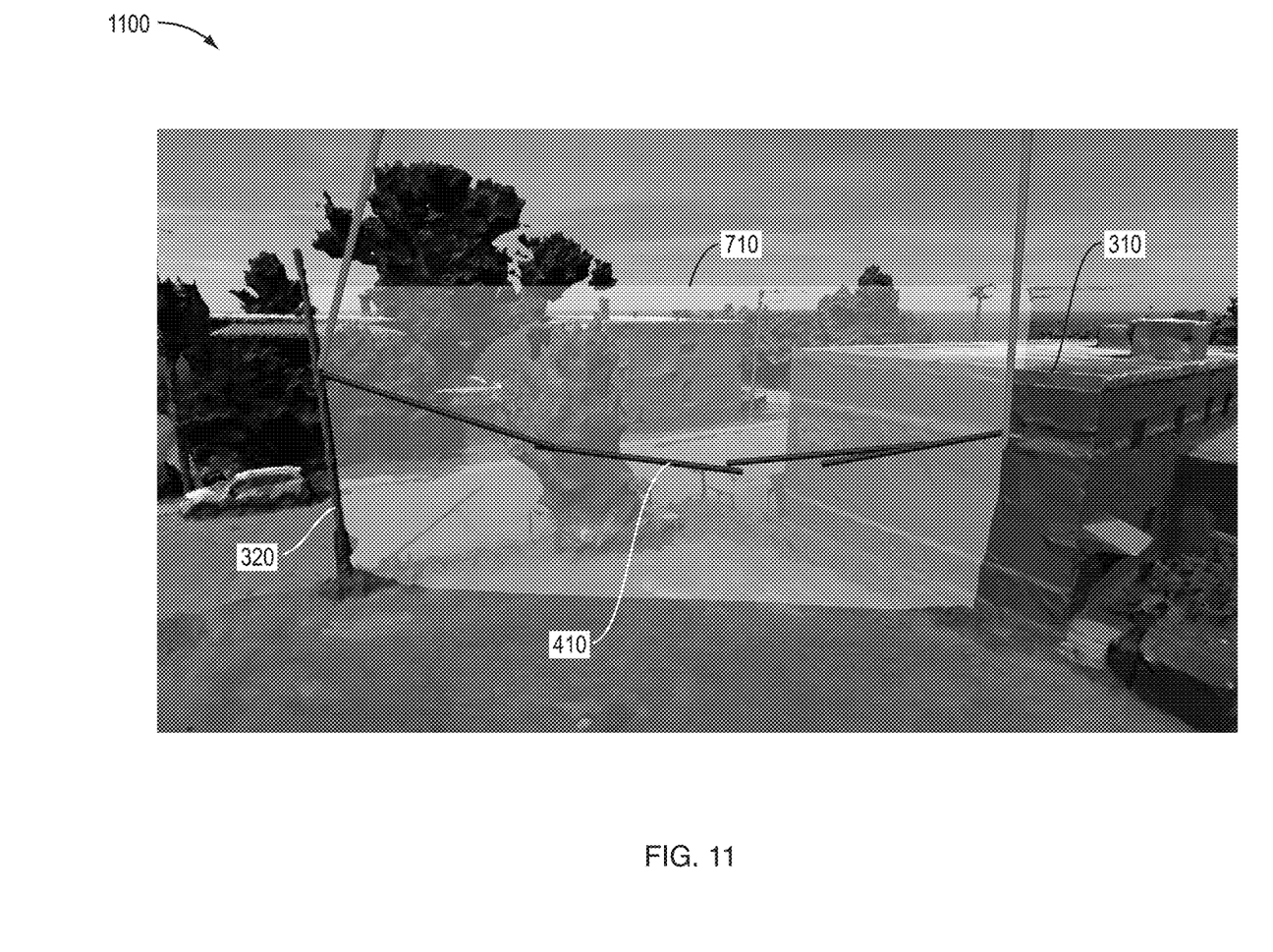
FIG. 11 is an enlarged view focusing on the vertical plane of FIG. 10.

FIG. 10 is a view 1000 of an example 3D model showing line segments 410 that include pixels that represent an aerial cable projected onto a vertical plane 710. FIG. 11 is an enlarged view 1100 focusing on the vertical plane 710 of FIG. 10.

At step 240, for the given cable segment of the aerial cable, the software application uses the pixels projected onto the vertical plane to calculate a curve representation for the aerial cable segment. The curve representation may be a catenary equation. Alternatively, the curve representation may be a parabolic equation, or another type of equation that defines a curved shape. In still other alternatives, the curve representation may be a list of 3D points or other non-equation-based definition of a curved shape.

To calculate the curve representation the software application may utilize a weighted least squares algorithm, where weights for each pixel are based on any of a number of factors, such as the distance from the image capture location to the aerial cable, the angle between a normal to a camera plane and a normal to the vertical plane (e.g., with pixels from images captured at straight on given more weight and more obliquely given less weight), image quality measurements (e.g., with clearer images taken under better conditions given more weight), etc. In a specific example that uses just the first two of these criteria, weights for each pixel may be defined as:

$$Weight_{total} = \frac{A * Weight_{distance} + B * Weight_{angle}}{A + B}; \text{with}$$

$$Weight_{distance} = \frac{1}{\log(|d - d_{opt}| * C + 1)}; \text{and}$$

$$Weight_{angle} = 1 - \arccos\left(\frac{\frac{(a \cdot b)}{norm(a) * norm(b)}}{90}\right),$$

where d_opt is an optimal distance from the image capture location to the aerial cable, a is a normal to the vertical plane, b is a normal to a camera plane, and A, B and C are constants selected for the particular implementation. Alternatively, rather than weighted least squares, other types of parameter estimation and inference algorithms for linear regression may be used.

Figure 12:
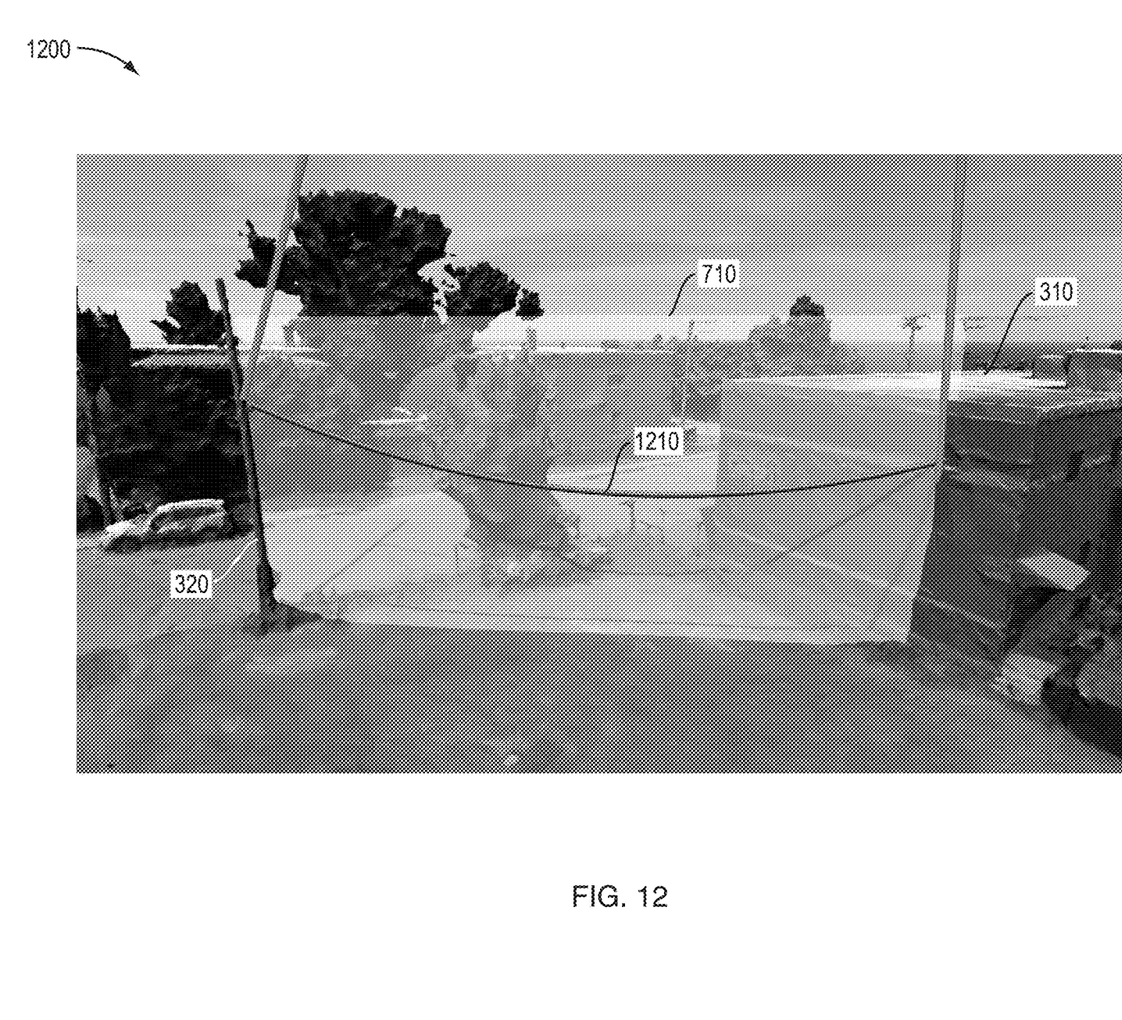
FIG. 12 is a view of an example 3D model showing aerial cable position given by a curve representation (e.g., a catenary equation) calculated from the pixels projected onto the vertical plane.

FIG. 12 is a view 1200 of an example 3D model showing aerial cable position 1210 given by a curve representation (e.g., a catenary equation) calculated from pixels projected onto the vertical plane.

At step 245, for the given cable segment of the aerial cable, the software application uses the catenary equation to define a cable model for that segment and adds the cable model to the previously-generated 3D model.

Finally, at step 250, the software application determines whether there are any remaining cable segments in the aerial cable. If so, execution loops back to step 220, and operations are repeated for the next cable segment. If not, execution terminates.

It should be understood that various adaptations and modifications may be readily made to what is described above, to suit various implementations and environments. For example, while it is discussed above that many aspects of the techniques may be implemented by specific software processes executing on specific hardware, it should be understood that some or all of the techniques may also be implemented by different software on different hardware. In addition to general-purpose computing devices/electronic devices, the hardware may include specially configured logic circuits and/or other types of hardware components. Above all, it should be understood that the above descriptions are meant to be taken only by way of example.

What is claimed is:

1. A method for detecting and three-dimensionally (3D) modeling an aerial cable from images, comprising:
    obtaining a set of images that include the aerial cable;
    generating a 3D model from the set of images, the 3D model to initially exclude the aerial cable;
    processing, by a software application executing on one or more electronic devices, each image of the set of images to extract pixels that potentially represent cables;
    determining a position in 3D space of the 3D model of a pair of attachment points for the aerial cable;
    defining, by the application, a vertical plane in 3D space of the 3D model based on the pair of cable attachment points;
    for each of one or more images of the set of images, projecting, by the application, at least some of the pixels that potentially represent cables onto the vertical plane;
    calculating, by the application, a curve representation for the aerial cable based on the pixels projected onto the vertical plane; and
    adding a cable model defined by the curve representation to the 3D model to represent the aerial cable.

2. The method of claim 1, wherein the aerial cable includes a plurality of cable segments, the curve representation for the aerial cable represents a single cable segment of the plurality of cable segments, and the determining the position of the pair of cable attachment points, defining the vertical plane, projecting at least some of the pixels, calculating the curve representation, and adding the cable model are repeated for each of the plurality of cable segments of the aerial cable.

3. The method of claim 1, wherein the set of images comprises photographs, and the obtaining the set of images comprises:
    capturing the set of images with a handheld or unmanned aerial vehicle (UAV) mounted camera.

4. The method of claim 1, wherein the application is a photogrammetry application, and the generating the 3D model further comprises:
    automatically producing the 3D model, by the photogrammetry application, using an aero-triangulation stage that implements structure from motion (SfM) photogrammetry and a dense 3D reconstruction phase that implements multi-view stereo (MVS) reconstruction.

5. The method of claim 1, wherein the processing each image further comprises:
    applying a Canny edge detector to produce a binary image; and
    applying a Hough transform to the binary image to produce parameters of line segments, wherein each of the line segments includes a plurality of pixels that potentially represent cables.

6. The method of claim 1, wherein the determining the position of the pair of cable attachment points further comprises:
    receiving one or more user selections indicating each of the pair of cable attachment points in a user interface of the application, wherein the position of the pair of cable attachment points is determined based on the one or more user selections.

7. The method of claim 6, wherein each user selection includes a selection in an image of the plurality of images, and the determining the position of the pair of cable attachment points further comprises:
    projecting the pair of cable attachment points in the image into 3D space of the 3D model to determine the position in the 3D model.

8. The method of claim 7, wherein the projecting the pair of cable attachment points comprises:
    for each cable attachment point, searching the 3D model within a cone around a projection vector based on a corresponding selection in the image to locate an object in the 3D model whose position is used as the position of the cable attachment point.

9. The method of claim 8, wherein the user selection includes selections in multiple images of the plurality of images, and the determining the position of the pair of cable attachment points further comprises:
    for each cable attachment point, searching the 3D model within an intersection of cones of projection vectors that are each based on corresponding selections in a respective one of the multiple images to locate an object in the 3D model whose position is used as the position of the cable attachment point.

10. The method of claim 1, wherein the determining the position of the pair of cable attachment points further comprises:
    automatically determining the position of the pair of cable attachment points based on a detected curve discontinuity at positions along the aerial cable in an image of the set of images.

11. The method of claim 10, wherein the automatically determining the position of the pair of cable attachment points further comprises:
    obtaining a plurality of line segments, wherein each of the line segments includes a plurality of pixels that potentially represent cables;
    determining cable segments of the aerial cable based on angle change in the plurality of line segments;
    calculating an equation of each cable segment of the aerial cable;
    determining intersections of the equations of each cable segment of the aerial cable; and projecting the intersections of the equations from the image into 3D space of the 3D model to determine the position in the 3D model.

12. The method of claim 11, wherein the automatically determining the position of the pair of cable attachment points further comprises:
applying a trained machine learning algorithm to an image of the set of images to identify the pair of cable attachment points; and
projecting the pair of cable attachment points in the image into 3D space of the 3D model to determine the position in the 3D model.

13. The method of claim 1, further comprising:
projecting the position in 3D space of the pair of cable attachment points onto one or more images of the set of images to select from the pixels that potentially represent cables pixels that represent the aerial cable,
wherein the projecting at least some of the pixels projects the pixels that represent the aerial cable onto the vertical plane.

14. The method of claim 13, wherein the projecting the position in 3D space of the pair of cable attachment points further comprises:
using the projection of the pair of cable attachment points to eliminate pixels that potentially represent cables that are inconsistent with the pair of cable attachment points to leave the pixels that represent the aerial cable.

15. The method of claim 1, wherein each of the one or more images is associated with a position in the 3D space of the 3D model and the calculating the curve representation further comprises:
applying a weighted least squares algorithm wherein weights for each pixel are based on at least one of distance from an image capture location to the aerial cable, an angle between a normal to a camera plane and a normal to the vertical plane, or image quality measurements for an image.

16. The method of claim 1, wherein the defining the vertical plane further comprises:
defining the vertical plane to be bounded horizontally by a horizontal position of each of the pair of cable attachment points and to be bounded vertically by ground and by a height that is based on a vertical position of one or more of the cable attachment points.

17. An electronic device comprising:
a processor; and
a memory coupled to the processor and configured to store a photogrammetry application, the photogrammetry application when executed operable to:
generate a 3D model from a set of images that include an aerial cable, the 3D model to initially exclude the aerial cable;
determine a position in the 3D model of a pair of attachment points for the aerial cable;
define a vertical plane in 3D space of the 3D model based on the pair of cable attachment points;
project pixels that represent the aerial cable from the set of images onto the vertical plane;
calculate a curve representation for the aerial cable based on the pixels projected onto the vertical plane; and
add a cable model defined by the curve representation to the 3D model to represent the aerial cable.

18. A non-transitory electronic-device readable medium having instructions stored thereon, the instructions when executed by one or more electronic devices operable to:
generate a 3D model from a set of images that include an aerial cable, the 3D model to initially exclude the aerial cable;
determine a position in the 3D model of a pair of attachment points for the aerial cable;
define a vertical plane in 3D space of the 3D model based on the pair of cable attachment points;
produce a cable model based on photogrammetry calculations for the aerial cable that are constrained based on the vertical plane; and
add the cable model to the 3D model to represent the aerial cable.

19. The non-transitory electronic-device readable medium of claim 18, wherein the instructions when executed to produce the cable model are further operable to:
project the pair of cable attachment points onto one or more images of the set of images to select from pixels that potentially represent cables pixels that represent the aerial cable; and
for each of the one or more images, project the pixels that represent the aerial cable onto the vertical plane.

20. The non-transitory electronic-device readable medium of claim 19, wherein the instructions when executed to produce a model are further operable to:
calculate a curve representation for the aerial cable based on the pixels projected onto the vertical plane, and
wherein the model is based on the curve representation.

21. The non-transitory electronic-device readable medium of claim 18, wherein the instructions when executed are further operable to:
receive one or more user selections indicating each of the pair of cable attachment points in a user interface, wherein the position of the pair of cable attachment points is determined based on the one or more user selections.

* * * * *